(12) United States Patent
Hongo et al.

(10) Patent No.: US 10,348,918 B2
(45) Date of Patent: Jul. 9, 2019

(54) IMAGE READING APPARATUS

(71) Applicant: PFU Limited, Ishikawa (JP)

(72) Inventors: Masanobu Hongo, Ishikawa (JP);
Masaaki Yamashita, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 16/101,012

(22) Filed: Aug. 10, 2018

(65) Prior Publication Data

US 2018/0352099 A1    Dec. 6, 2018

Related U.S. Application Data

(63) Continuation of application No. PCT/JP2016/062947, filed on Apr. 25, 2016.

(51) Int. Cl.
*H04N 1/00* (2006.01)
*G03G 15/00* (2006.01)
(Continued)

(52) U.S. Cl.
CPC .......... *H04N 1/00535* (2013.01); *B65H 1/02* (2013.01); *B65H 31/02* (2013.01); *G03G 15/00* (2013.01); *H04N 1/00* (2013.01); *H04N 1/00612* (2013.01); *H04N 1/00631* (2013.01); *B65H 2301/42142* (2013.01); *B65H 2402/31* (2013.01); *B65H 2402/343* (2013.01);
(Continued)

(58) Field of Classification Search
CPC combination set(s) only.
See application file for complete search history.

(56) References Cited

U.S. PATENT DOCUMENTS 6,011,940 A    1/2000   Van Lydegraf
6,027,114 A    2/2000   Watanabe et al.
(Continued)

FOREIGN PATENT DOCUMENTS

JP    04-345876 A    12/1992
JP    08-295447 A    11/1996
(Continued)

OTHER PUBLICATIONS

International Search Report issued in related parent International Application No. PCT/JP2016/062947, dated Jul. 19, 2016, with English Translation.

*Primary Examiner* — Helen Zong
(74) *Attorney, Agent, or Firm* — McDermott Will & Emery LLP

(57) ABSTRACT

An image reading apparatus includes a shooter where a first mounting surface that is inclined with respect to a horizontal plane is formed thereon, a stacker, a supporting unit that movably supports the stacker in such a manner that the stacker is arranged in a first region or a second region, a conveyance unit that conveys a document from the shooter to the stacker when the stacker is arranged in the first region, and a reading unit that reads an image from the document when the document is conveyed by the conveyance unit, wherein a surface area of a region of the first mounting surface that is covered by the stacker when the stacker is arranged in the first region is greater as compared with that when the stacker is arranged in the second region, and the stacker is formed to be capable of being lengthened or shortened.

10 Claims, 8 Drawing Sheets

(51) Int. Cl.
*B65H 31/02* (2006.01)
*B65H 1/02* (2006.01)

(52) U.S. Cl.
CPC ............... *B65H 2405/324* (2013.01); *B65H 2405/33125* (2013.01)

(56) References Cited

U.S. PATENT DOCUMENTS

2010/0060948 A1\* 3/2010 Yoshida ............ H04N 1/00519
358/474
2014/0104661 A1 4/2014 Guan et al.

FOREIGN PATENT DOCUMENTS

| | | |
|---|---|---|
| JP | 09-086762 A | 3/1997 |
| JP | 2000-115432 A | 4/2000 |
| JP | 2000-181167 A | 6/2000 |
| JP | 2006-096424 A | 4/2006 |
| JP | 2007-254121 A | 10/2007 |
| JP | 2010-068336 A | 3/2010 |
| JP | 2013-012794 A | 1/2013 |
| JP | 2013-535156 A | 9/2013 |
| JP | 2016-005184 A | 1/2016 |

\* cited by examiner

IMAGE READING APPARATUS

CROSS-REFERENCE TO RELATED APPLICATION

This application is a continuation of International Application No. PCT/JP2016/062947, filed on Apr. 25, 2016 and designated the U.S., the entire contents of which are incorporated herein by reference.

FIELD

The present disclosure relates to an image reading apparatus.

BACKGROUND

An image reading apparatus has been known that causes a U-turn of, and conveys, a document. In such an image reading apparatus, a document tray where a paper sheet of a document to be fed is mounted thereon is provided at a back of the apparatus and a document ejection tray where an ejected paper sheet of a document is mounted thereon is provided in front of and above the document tray, so that it is possible to reduce an installation space thereof. Furthermore, in such an image reading apparatus, a document ejection tray is moved away when a document is stacked on a document tray, so that its convenience is improved (see Japanese Laid-open Patent Publication No. 2006-096424, Japanese Laid-open Patent Publication No. 9-086762, or Japanese Laid-open Patent Publication No. 2016-005184).

However, there is a problem in such an image reading apparatus in that a document ejection tray is arranged on top of the apparatus, so that a height of the apparatus is large.

SUMMARY

According to an aspect of an embodiment, an image reading apparatus includes a shooter where a first mounting surface that is inclined with respect to a horizontal plane is formed thereon, a stacker where a second mounting surface is formed thereon, a supporting unit that movably supports the stacker in such a manner that the stacker is arranged in a first region or a second region, a conveyance unit that conveys a document that is mounted on the first mounting surface from the shooter to the stacker in such a manner that a back surface for a surface of the document that faces the first mounting surface faces the second mounting surface after conveyance thereof when the stacker is arranged in the first region, and thereby, mounts the document on the second mounting surface, and a reading unit that reads an image from the document when the document is conveyed by the conveyance unit, wherein a surface area of a region of the first mounting surface that is covered by the stacker when the stacker is arranged in the first region is greater than a surface area of a region of the first mounting surface that is covered by the stacker when the stacker is arranged in the second region, and the stacker is formed to be capable of being lengthened or shortened in such a manner that the stacker is lengthened when the stacker is in the first region and the stacker is shortened when the stacker is in the second region.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the disclosure will be explained with reference to accompanying drawings. Hereinafter, an image reading apparatus according to embodiments as disclosed in the present application will be explained with reference to the drawings. The present application is not limited by the following descriptions. In the following descriptions, an identical component is provided with an identical sign and a redundant explanation thereof will be omitted.

Image Reading Apparatus

Figure 1:
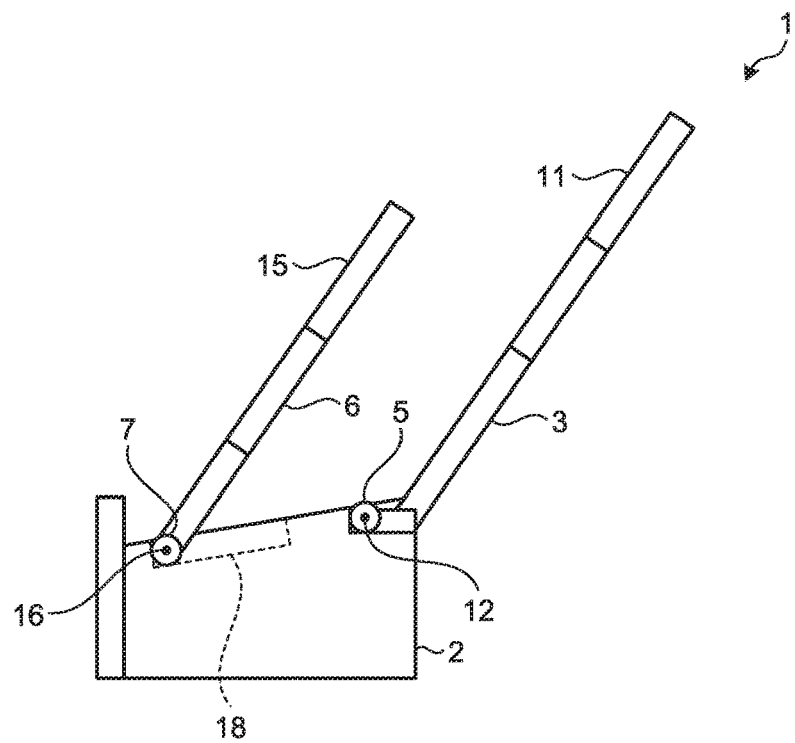
FIG. 1 is a side view illustrating an image reading apparatus according to an embodiment.

FIG. 1 is a side view illustrating an image reading apparatus 1 according to an embodiment. As illustrated in FIG. 1, the image reading apparatus 1 includes a housing 2, a shooter 3, a shooter supporting unit 5, a stacker 6, and a stacker supporting unit 7. The housing 2 is formed into a box shape and mounted on an installation surface where the image reading apparatus 1 is installed thereon. The shooter 3 is formed into a board shape and a shooter mounting surface 11 that is substantially flat is formed thereon. The shooter 3 is arranged on a top of the housing 2 on a back side thereof in such a manner that, when an installation surface of the image reading apparatus 1 is horizontal, the shooter mounting surface 11 is directed obliquely upward and an angle of the shooter mounting surface 11 with respect to the installation surface of the image reading apparatus 1 is equal to 55 degrees. The shooter supporting unit 5 supports the shooter 3 in such a manner that it is possible for the shooter 3 to rotate around a rotation axis 12 with respect to the housing 2. The rotation axis 12 is parallel to an installation surface of the image reading apparatus 1 and parallel to the shooter mounting surface 11. The shooter supporting unit 5 prevents the shooter 3 from rotating in such a manner that an angle of the shooter mounting surface with respect to an installation surface of the image reading apparatus 1 is not less than 55 degrees. That is, the shooter supporting unit 5 supports the shooter 3 in such a manner that the shooter 3 does not clockwise rotate around the rotation axis 12 from a state as illustrated in FIG. 1 due to gravitational force.

The stacker 6 is formed into a board shape and a stacker mounting surface 15 that is substantially flat is formed thereon. The stacker 6 is arranged on a top of the housing 2 on a front side thereof, in such a manner that the stacker mounting surface 15 is substantially parallel to the shooter mounting surface 11, that is, in such a manner that the stacker mounting surface 15 is directed obliquely upward and an angle of the stacker mounting surface 15 with respect to an installation surface of the image reading apparatus 1 is equal to 55 degrees. The stacker 6 is thus arranged, and thereby, covers a part of the shooter mounting surface 11. The stacker supporting unit 7 supports the stacker 6 in such a manner that it is possible for the stacker 6 to rotate around a rotation axis 16 with respect to the housing 2. The rotation axis 16 is parallel to the rotation axis 12, that is, parallel to an installation surface of the image reading apparatus 1 and parallel to the stacker mounting surface 15. The stacker supporting unit 7 prevents the stacker 6 from rotating in such a manner that an angle of the stacker mounting surface 15 with respect to an installation surface of the image reading apparatus 1 is not greater than 55 degrees. That is, the stacker supporting unit 7 supports the stacker 6 in such a manner that the stacker 6 does not counterclockwise rotate around the rotation axis 16 from a state as illustrated in FIG. 1.

For the image reading apparatus 1, a stacker storage region 18 is formed therein. The stacker storage region 18 is formed between the shooter 3 and the stacker 6 on a top of the housing 2 and closer to a region where the shooter 3 is arranged therein than a region where the stacker 6 is arranged therein.

Figure 2:
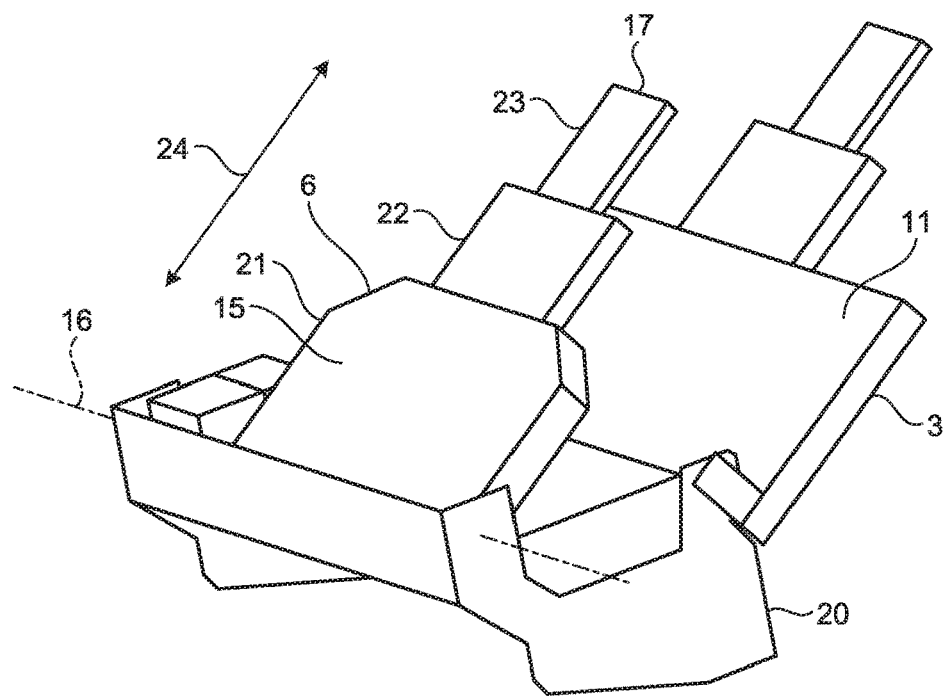
FIG. 2 is a perspective view illustrating a stacker and a shooter.

FIG. 2 is a perspective view illustrating the stacker 6 and the shooter 3. As illustrated in FIG. 2, the image reading apparatus 1 further includes a base unit 20. The base unit 20 is arranged inside the housing 2 and fixed in the housing 2. The stacker 6 includes a first stacker member 21, a second stacker member 22, and a third stacker member 23. The first stacker member 21 is formed into a board shape and forms a part of the stacker mounting surface 15. The first stacker member 21 is supported on the base part 20 by the stacker supporting unit 7 to be rotatable around the rotation axis 16. The second stacker member 22 is formed into a board shape thinner than the first stacker member 21 and forms a part of the stacker mounting surface 15. The second stacker member 22 is supported on the first stacker member 21 to be capable of translating in parallel to a lengthening or shortening direction 24 in such a manner that it is possible to draw the second stacker member 22 from an interior of the first stacker member 21 or push the second stacker member 22 into the interior of the first stacker member 21. The lengthening or shortening direction 24 is perpendicular to the rotation axis 16 and parallel to the stacker mounting surface 15. The third stacker member 23 is formed into a board shape thinner than the second stacker member 22 and forms a part of the stacker mounting surface 15. The third stacker member 23 is supported on the second stacker member 22 to be capable of translating in parallel to the lengthening or shortening direction 24 in such a manner that it is possible to draw the third stacker member 23 from an interior of the second stacker member 22 or push the third stacker member 23 into the interior of the second stacker member 22. The stacker 6 is thus formed, and thereby, formed to be capable of lengthening or shortening where the stacker 6 is shortened in such a manner that an end part 17 on a side far from the rotation axis 16 moves closer to the rotation axis 16 or the stacker 6 is lengthened in such a manner that the end part 17 moves away from the rotation axis 16.

The stacker 6 further includes a non-illustrated interlocking mechanism. Such an interlocking mechanism converts movement of the second stacker member 22 to be drawn from the first stacker member 21 or to be pushed into the first stacker member 21 into movement of the third stacker member 23 to be drawn from the second stacker member 22 or to be pushed into the second stacker member 22. That is, such an interlocking mechanism mechanically converts movement of the second stacker member 22 to be drawn from the first stacker member 21 into movement of the third stacker member 23 to be drawn from the second stacker member 22. Such an interlocking mechanism mechanically converts movement of the second stacker member 22 to be pushed into the first stacker member 21 into movement of the third stacker member 23 to be pushed into the second stacker member 22. The stacker 6 includes such an interlocking mechanism, and thereby, is lengthened or shortened so that the second stacker member 22 is drawn from the first stacker member 21 or pushed into the first stacker member 21.

Figure 3:
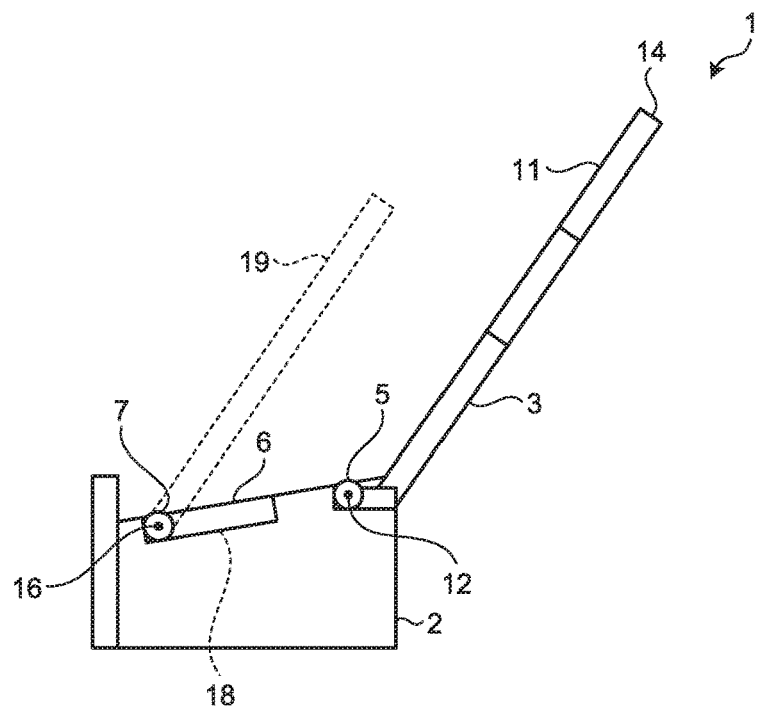
FIG. 3 is a side view illustrating an image reading apparatus when a stacker is stored.

FIG. 3 is a side view illustrating the image reading apparatus 1 when the stacker 6 is stored in the stacker storage region 18. As illustrated in FIG. 3, when the stacker 6 is shortened, the stacker 6 rotates around the rotation axis 16, and thereby, is arranged and stored in the stacker storage region 18. That is, the stacker supporting unit 7 moveably supports the stacker 6 in such a manner that the stacker 6 is arranged in the stacker storage region 18 or a stacker development region 19. The stacker development region 19 is a region where the stacker 6 is arranged therein in FIG. 1. That is, the stacker 6 is arranged in the stacker development region 19, so that the stacker mounting surface 15 is directed obliquely upward and its angle with respect to an installation surface of the image reading apparatus 1 is substantially equal to 55 degrees.

The stacker 6 is arranged in the stacker storage region 18, and thereby, exposes the shooter mounting surface 11, so that it is possible to reduce a surface area of a region on the shooter mounting surface 11 that is covered by the stacker 6, as compared with that when the stacker 6 is arranged in the stacker development region 19. That is, a surface area of a graphic provided by orthographically projecting, onto the shooter mounting surface 11, the stacker 6 that is arranged in the stacker storage region 18 is less than a surface area of a graphic provided by orthographically projecting, onto the shooter mounting surface 11, the stacker 6 that is arranged in the stacker development region 19.

Figure 4:
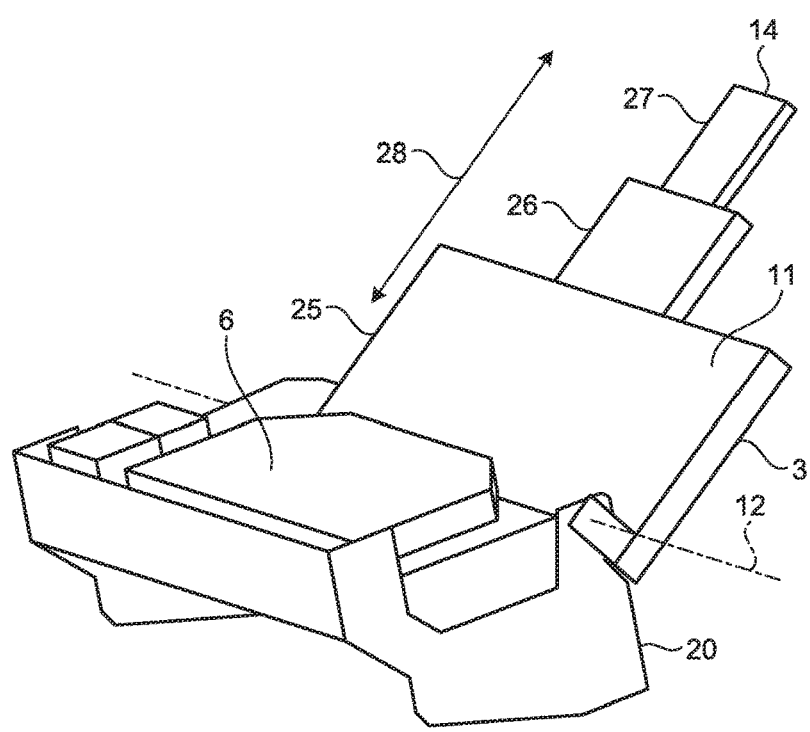
FIG. 4 is a perspective view illustrating a stacker and a shooter when the stacker is stored.

FIG. 4 is a perspective view illustrating the stacker 6 and the shooter 3 when the stacker 6 is stored in the stacker storage region 18. As illustrated in FIG. 4, the shooter 3 includes a first shooter member 25, a second shooter member 26, and a third shooter member 27. The first shooter member 25 is formed into a board shape and forms a part of the shooter mounting surface 11. The first shooter member 25 is supported on the base part 20 by the shooter supporting unit 5 to be rotatable around the rotation axis 12. The second shooter member 26 is formed into a board shape thinner than the first shooter member 25 and forms a part of the shooter mounting surface 11. The second shooter member 26 is supported by the first shooter member 25 to be capable of translating in parallel to a lengthening or shortening direction 28 in such a manner that it is possible to draw the second shooter member 26 from an interior of the first shooter member 25 or push the second shooter member 26 into the interior of the first shooter member 25. The lengthening or shortening direction 28 is perpendicular to the rotation axis 12 and parallel to the shooter mounting surface 11. The third shooter member 27 is formed into a board shape thinner than the second shooter member 26 and forms a part of the shooter mounting surface 11. The third shooter member 27 is supported by the second shooter member 26 to be capable of translating in parallel to the lengthening or shortening direction 28 in such a manner that it is possible to draw the third shooter member 27 from an interior of the second shooter member 26 or push the third shooter member 27 into the interior of the second shooter member 26. The shooter 3 is thus formed, and thereby, formed to be capable of lengthening or shortening where the shooter 3 is shortened in such a manner that an end part 14 on a side far from the rotation axis 12 moves closer to the rotation axis 12 or the shooter 3 is lengthened in such a manner that the end part 14 moves away from the rotation axis 12.

Figure 5:
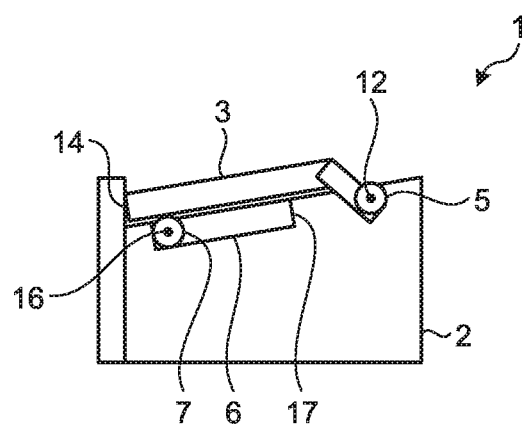
FIG. 5 is a side view illustrating an image reading apparatus when a shooter is stored.
Figure 6:
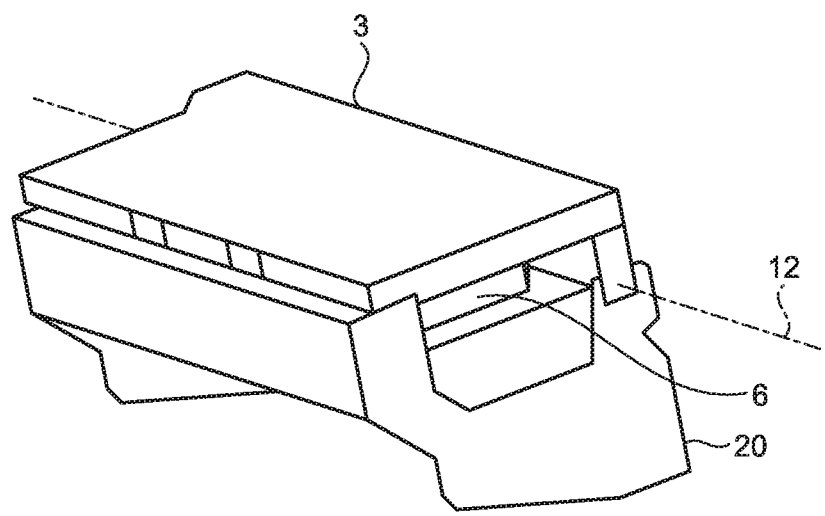
FIG. 6 is a perspective view illustrating a stacker and a shooter when the shooter is stored.

FIG. 5 is a side view illustrating the image reading apparatus 1 when the shooter 3 is stored. FIG. 6 is a perspective view illustrating the stacker 6 and the shooter 3 when the shooter 3 is stored. As illustrated in FIG. 5, when the stacker 6 is stored in the stacker storage region 18, the shooter 3 rotates around the rotation axis 12, so that it is possible to arrange the shooter 3 above the stacker 6. The shooter 3 is shortened and arranged above the stacker 6, and thereby, stored. That is, the shooter supporting unit 5 movably supports the shooter 3 in such a manner that the shooter 3 is developed as illustrated in FIG. 3 or the shooter 3 is stored above the stacker 6 as illustrated in FIG. 5. The shooter 3 is stored, so that an apparatus height is reduced and the image reading apparatus 1 is downsized. The shooter 3 is stored, so that it is possible to cover the stacker 6 as illustrated in FIG. 6.

Figure 7:
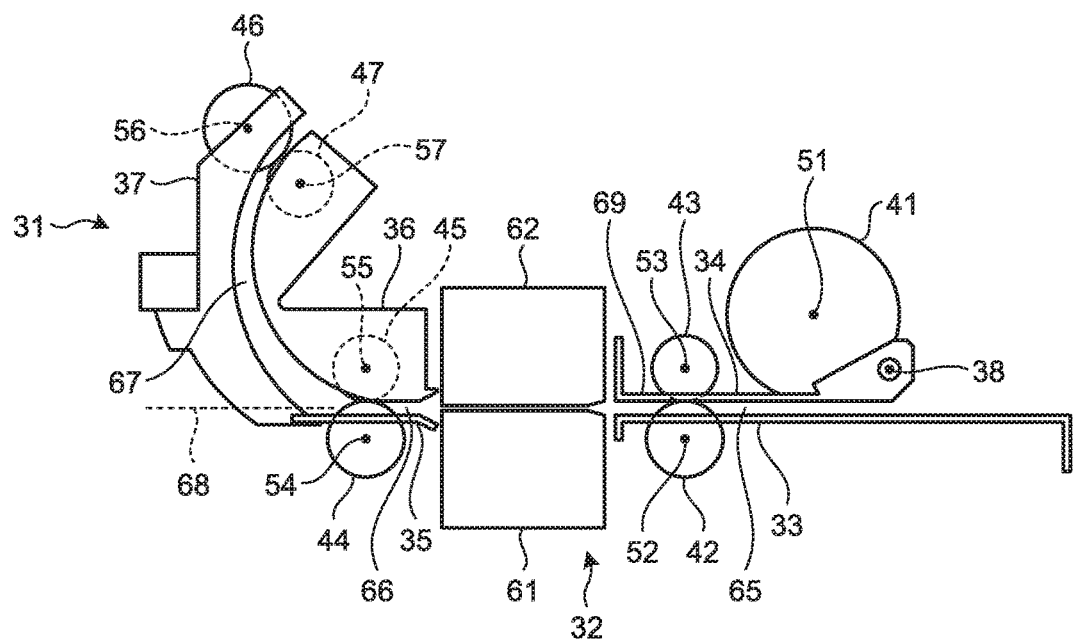
FIG. 7 is a cross-sectional view illustrating a conveyance device and a reading device.

FIG. 7 is a cross-sectional view illustrating a conveyance device 31 and a reading device 32. As illustrated in FIG. 7, the image reading apparatus 1 further includes the conveyance device 31 and the reading device 32.

Conveyance Device

The conveyance device 31 is arranged inside the housing 2. The conveyance device 31 includes a plurality of conveyance guides 33 to 37 and a plurality of conveyance rollers 41 to 47. The plurality of conveyance guides 33 to 37 include a first conveyance guide 33, a second conveyance guide 34, a third conveyance guide 35, a fourth conveyance guide 36, and a fifth conveyance guide 37. The first conveyance guide 33 is formed into a board shape that is substantially flat. The first conveyance guide 33 is arranged so as to be along a plane that is substantially parallel to an installation surface of the image reading apparatus 1, and fixed on the base unit 20. The second conveyance guide 34 is formed into a board shape that is substantially flat. The second conveyance guide 34 is arranged above the first conveyance guide 33 so as to face the first conveyance guide 33. The second conveyance guide 34 is supported on the base unit 20 to be rotatable around a rotation axis 38. The rotation axis 38 is parallel to the rotation axis 12 of the shooter 3 and arranged at an end of the second conveyance guide 34 on a side close to the shooter 3.

The third conveyance guide 35 is substantially formed into a board shape. The third conveyance guide 35 is arranged on a front side of the first conveyance guide 33 so as to be along a plane along the first conveyance guide 33, and fixed on the base unit 20. The fourth conveyance guide 36 is formed into a cylindrical body shape and a convex surface along a part of a side surface of a circular cylinder is formed thereon. The fourth conveyance guide 36 is arranged above the third conveyance guide 35 in such a manner that a part of such a convex surface faces the third conveyance guide 35. The fourth conveyance guide 36 is fixed on the base unit 20. The fifth conveyance guide 37 is formed into a cylindrical body shape and a concave surface along a part of a side surface of a circular cylinder is formed thereon. The fifth conveyance guide 37 is arranged on a front side of the fourth conveyance guide 36 in such a manner that such a concave surface faces a convex surface of the fourth conveyance guide 36. The fifth conveyance guide 37 is supported on the based part 20 to be capable of moving up and down.

The conveyance device 31 includes the plurality of conveyance guides 33 to 37, so that a conveyance path 65, a conveyance path 66, a conveyance path 67, and a conveyance path 68 are formed therein. The conveyance path 65 is formed between the first conveyance guide 33 and the second conveyance guide 34. The conveyance path 65 is formed so as to be along a plane that is parallel to an installation surface of the image reading apparatus 1. The conveyance path 65 is formed so as to be connected to the shooter mounting surface 11 when the shooter 3 is developed. The conveyance path 66 is formed between the third conveyance guide 35 and the fourth conveyance guide 36. The conveyance path 66 is formed so as to be along a plane along the conveyance path 65.

The conveyance path 67 is formed between the fourth conveyance guide 36 and the fifth conveyance guide 37 when the fifth conveyance guide 37 moves down in such a manner that the fifth conveyance guide 37 intersects with a plane along the conveyance path 65. The conveyance path 67 is formed so as to be along a side face of a circular cylinder. The conveyance path 67 is formed so as to be connected to the stacker mounting surface 15 when the stacker 6 is arranged in the stacker development region 19. The conveyance path 68 is formed on an underside of the fifth conveyance guide 37 when the fifth conveyance guide 37 moves up in such a manner that the fifth conveyance guide 37 does not intersect with a plane along the conveyance path 65. The conveyance path 68 is formed so as to be along a plane along the conveyance path 65. The conveyance path 68 is formed so as to be connected to an outside of the housing 2.

The plurality of conveyance rollers 41 to 47 include a first conveyance roller 41, a second conveyance roller 42, a third conveyance roller 43, a fourth conveyance roller 44, a fifth conveyance roller 45, a sixth conveyance roller 46, and a seventh conveyance roller 47. The first conveyance roller 41 is formed into a circularly cylindrical shape and arranged above the conveyance path 65. The first conveyance roller 41 is supported on the base unit 20 to be rotatable around a rotation axis 51. The rotation axis 51 is parallel to the rotation axis 12. The first conveyance roller 41 is arranged so as to contact a document that is mounted on the shooter mounting surface 11 of the developed shooter 3. The first conveyance roller 41 normally rotates (clockwise in FIG. 7) around the rotation axis 51, so that one document that contacts the first conveyance roller 41 among a plurality of documents that are mounted on the shooter mounting surface 11 is conveyed to the conveyance path 65.

The second conveyance roller 42 is formed into a circularly cylindrical shape and arranged on a front side of the first conveyance roller 41 below the conveyance path 65. The second conveyance roller 42 is supported on the base unit 20 to be rotatable around a rotation axis 52. The rotation axis 52 is parallel to the rotation axis 51. The third conveyance roller 43 is formed into a circularly cylindrical shape and arranged above the second conveyance roller 42. The third conveyance roller 43 is supported on the base unit 20 to be rotatable around a rotation axis 53. The rotation axis 53 is parallel to the rotation axis 51. The second conveyance roller 42 and the third conveyance roller 43 are arranged in such a manner that a document that is conveyed on the conveyance path 65 is interposed between the second conveyance roller 42 and the third conveyance roller 43. The second conveyance roller 42 normally rotates (counterclockwise in FIG. 7) around the rotation axis 52 and the third conveyance roller 43 normally rotates (clockwise in FIG. 7) around the rotation axis 53, so that a document that is conveyed on the conveyance path 65 is conveyed to the conveyance path 66. The second conveyance guide 34 rotates around the rotation axis 38 in such a manner that a document that is conveyed on the conveyance path 65 contacts an end 69 of the second conveyance guide 34 on a side far from the rotation axis 38, and thereby, the end 69 is arranged at a height that corresponds to a thickness of such a document. That is, a height where the end 69 of the second conveyance guide 34 is arranged increases with increasing a thickness of a document that is conveyed on the conveyance path 65.

The fourth conveyance roller 44 is formed into a circularly cylindrical shape and arranged below the conveyance path 66. The fourth conveyance roller 44 is supported on the base unit 20 to be rotatable around a rotation axis 54 and to be capable of moving up and down in a vertical direction. The fifth conveyance roller 45 is formed into a circularly cylindrical shape and arranged above the conveyance path 66. The fifth conveyance roller 45 is supported on the base unit 20 to be rotatable around a rotation axis 55. The fourth conveyance roller 44 and the fifth conveyance roller 45 are arranged in such a manner that a document that is conveyed on the conveyance path 66 is interposed between the fourth conveyance roller 44 and the fifth conveyance roller 45. The fourth conveyance roller 44 moves up or down so as to be arranged at a height that corresponds to a thickness of a document that is conveyed on the conveyance path 66. That is, a height where the fourth conveyance roller 44 is arranged decreases with increasing a thickness of a document that is conveyed on the conveyance path 66.

When the fifth conveyance guide 37 moves down, the fourth conveyance roller 44 normally rotates (counterclockwise in FIG. 7) around the rotation axis 54 and the fifth conveyance roller 45 normally rotates (clockwise in FIG. 7) around the rotation axis 55, so that a document that is conveyed on the conveyance path 66 is conveyed to the conveyance path 67. When the fifth conveyance guide 37 moves up, the fourth conveyance roller 44 normally rotates around the rotation axis 54 and the fifth conveyance roller 45 normally rotates around the rotation axis 55, so that a document that is conveyed on the conveyance path 66 is not conveyed to the conveyance path 67 but is conveyed to the conveyance path 68 and its paper sheet is ejected to an outside of the housing 2.

The sixth conveyance roller 46 is formed into a circularly cylindrical shape and arranged on a front side of the conveyance path 67. The sixth conveyance roller 46 is supported on the base unit 20 to be rotatable around a rotation axis 56. The rotation axis 56 is parallel to the rotation axis 51. The seventh conveyance roller 47 is formed into a circularly cylindrical shape and arranged on a back side of the sixth conveyance roller 46. The seventh conveyance roller 47 is supported on the base unit 20 to be rotatable around a rotation axis 57. The rotation axis 57 is parallel to the rotation axis 51. The sixth conveyance roller 46 and the seventh conveyance roller 47 are arranged in such a manner that a document that is conveyed on the conveyance path 67 is interposed between the sixth conveyance roller 46 and the seventh conveyance roller 47. The sixth conveyance roller 46 normally rotates (counterclockwise in FIG. 7) around the rotation axis 56 and the seventh conveyance roller 47 normally rotates (clockwise in FIG. 7) around the rotation axis 57, so that a document that is conveyed on the conveyance path 67 is mounted on the stacker mounting surface 15 of the stacker 6 in the stacker development region 19.

The conveyance device 31 is thus configured, so that, when the fifth conveyance guide 37 moves down so as to block the conveyance path 68, a document that is mounted on the shooter 3 is conveyed to the stacker 6 through the conveyance paths 65, 66, and 67 and such a document is mounted on the stacker mounting surface 15. When such a document is mounted on the shooter 3, a surface that faces the shooter mounting surface 11 is a back surface for a surface that faces the stacker mounting surface 15 when such a document is mounted on the stacker mounting surface 15 of the stacker 6. When the fifth conveyance guide 37 moves up so as to open the conveyance path 68, the conveyance device 31 ejects a paper sheet of a document that is mounted on the shooter 3 to an outside of the housing 2 through the conveyance paths 65, 66, and 68.

Reading Device

The reading device 32 is arranged between the conveyance path 65 and the conveyance path 66 inside the housing 2. The reading device 32 includes a lower image sensor 61 and an upper image sensor 62. The lower image sensor 61 is arranged below a plane along the conveyance path 65 and the conveyance path 66, and fixed on the base unit 20. The lower image sensor 61 is composed of a Contact Image Sensor (CIS) type image sensor. The lower image sensor 61 contacts a lower reading surface of a document that is conveyed from the conveyance path 65 to the conveyance path 66, irradiates such a reading surface, and receives light that is reflected from such a reading surface, so that an image on such a reading surface is read thereby. The upper image sensor 62 is arranged above a plane along the conveyance path 65 and the conveyance path 66, and supported on the base unit 20 to be capable of translating parallel to a vertical direction. The upper image sensor 62 is composed of a CIS type image sensor. The upper image sensor 62 contacts an upper reading surface of a document that is conveyed from the conveyance path 65 to the conveyance path 66, irradiates such a reading surface, and receives light that is reflected from such a reading surface, so that an image on such a reading surface is read thereby.

Configuration of Image Reading Apparatus

Figure 8:
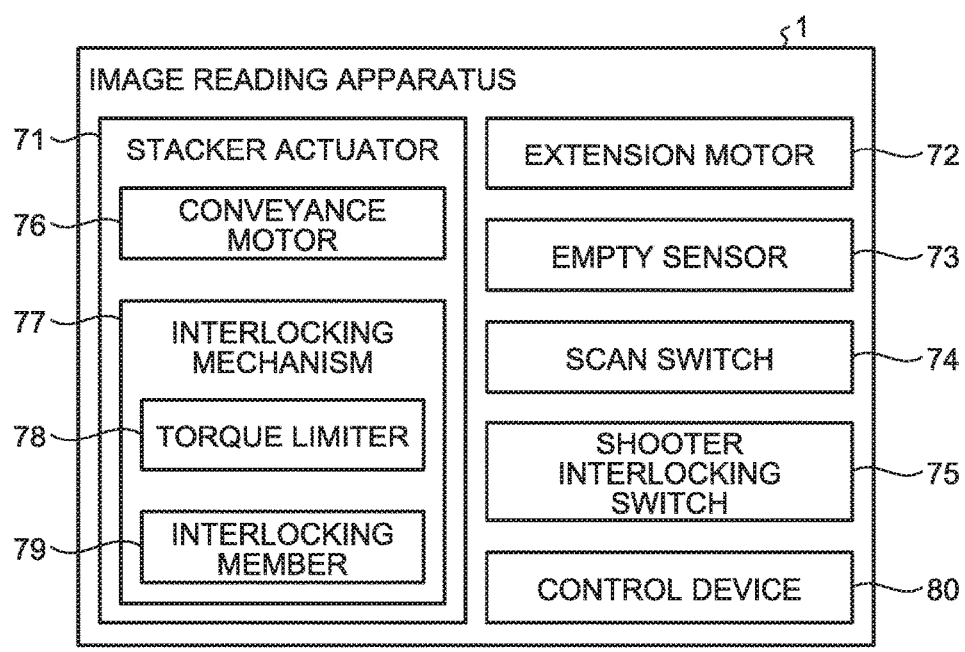
FIG. 8 is a block diagram illustrating an image reading apparatus.

FIG. 8 is a block diagram illustrating the image reading apparatus 1. As illustrated in FIG. 8, the image reading apparatus 1 further includes a stacker actuator 71, an extension motor 72, an empty sensor 73, a scan switch 74, a shooter interlocking switch 75, and a control device 80.

The stacker actuator 71 includes a conveyance motor 76 and an interlocking mechanism 77. The conveyance motor 76 is controlled by the control device 80, and thereby, normally rotates or reversely rotates to produce rotational power. The conveyance motor 76 normally rotates, and thereby, normally rotates the plurality of conveyance rollers 41 to 47 of the conveyance device 31 and transmits such produced rotational power to the plurality of conveyance rollers 41 to 47 of the conveyance device 31. The conveyance motor 76 transmits such produced rotational power to the interlocking mechanism 77.

The interlocking mechanism 77 includes a torque limiter 78 and an interlocking member 79. The torque limiter 78 transmits rotational power that is produced by the conveyance motor 76 to the interlocking member 79. When an absolute value of a torque that is transmitted to the interlocking member 79 is greater than a predetermined value, the torque limiter 78 blocks transmitting rotational power to the interlocking member 79. The interlocking member 79 converts rotational power that is transmitted from the conveyance motor 76 through the torque limiter 78 into movement of the stacker 6 to rotate around the rotation axis 16. When the conveyance motor 76 normally rotates, the interlocking mechanism 77 rotates the stacker 6 in such a manner that the stacker 6 is arranged in the stacker development region 19. When the conveyance motor 76 reversely rotates, the interlocking mechanism 77 rotates the stacker 6 in such a manner that the stacker 6 is arranged in the stacker storage region 18. That is, the stacker actuator 71 is controlled by the control device 80, and thereby, rotates the stacker 6 in such a manner that the stacker 6 is arranged in the stacker storage region 18 or the stacker 6 is arranged in the stacker development region 19.

The extension motor 72 is controlled by the control device 80, and thereby, normally rotates or reversely rotates. The extension motor 72 normally rotates, and thereby, draws the second stacker member 22 of the stacker 6 from the first stacker member 21 and draws the third stacker member 23 from the second stacker member 22, so that the stacker 6 is lengthened. The extension motor 72 reversely rotates, and thereby, pushes the second stacker member 22 of the stacker 6 into the first stacker member 21 and pushes the third stacker member 23 into the second stacker member 22, so that the stacker 6 is shortened.

The empty sensor 73 is arranged at an end of the shooter 3 on a side of the rotation axis 12 and controlled by the control device 80, and thereby, detects whether a document is mounted on the shooter 3. The scan switch 74 is arranged on top of the housing 2. The scan switch 74 is controlled by the control device 80, and thereby, detects whether the scan switch 74 is pushed by a user.

The shooter interlocking switch 75 supplies electric power to the control device 80 from a non-illustrated electric power source when the shooter 3 is developed. For such an electric power source, an electric battery that is arranged inside the housing 2 or an electric battery that is provided at an outside different from the image reading apparatus 1 is exemplified. The shooter interlocking switch 75 stops supplying electric power to the control device 80 from such an electric power source when the shooter 3 is stored.

The control device 80 is a so-called computer and includes a Central Processing Unit (CPU) and a storage device that are not illustrated. Such a CPU executes a computer program that is installed on the control device 80, and thereby, controls such a storage device. Such a CPU executes such a computer program and thereby, controls the reading device 32, the conveyance motor 76 of the stacker actuator 71, the extension motor 72, the empty sensor 73, and the scan switch 74. Such a storage device records such a computer program and records information that is utilized by such a CPU. A computer program that is installed on the control device 80 is composed of a plurality of computer programs for causing the control device 80 to realize each of a plurality of functions thereof.

The control device 80 controls the scan switch 74 in such a manner that whether the scan switch 74 is pushed is detected. The control device 80 controls the conveyance motor 76 in such a manner that the conveyance motor 76 normally rotates when it is detected that the scan switch 74 is pushed. The control device 80 controls the extension motor 72 in such a manner that the extension motor 72 normally rotates after a predetermined period of time is elapsed from a point of time when the conveyance motor 76 starts normal rotation thereof and before the stacker 6 is lengthened to have a predetermined length thereof. The control device 80 controls the reading device 32 in such a manner that an image on a document that is conveyed by the conveyance device 31 is read thereby. The control device 80 controls the empty sensor 73 in such a manner that whether a document is mounted on the shooter mounting surface 11 of the shooter 3 is detected when the conveyance motor 76 normally rotates. The control device 80 controls the conveyance motor 76 in such a manner that rotation of the conveyance motor 76 stops when the empty sensor 73 detects that a document is not mounted on the shooter mounting surface 11. The control device 80 controls the conveyance motor 76 in such a manner that the conveyance motor 76 reversely rotates after rotation of the conveyance motor 76 stops and before the stacker 6 is arranged in the stacker storage region 18. The control device 80 controls the extension motor 72 in such a manner that the extension motor 72 reversely rotates while the conveyance motor 76 reversely rotates, until the stacker 6 is shortened to have a predetermined length thereof.

Operation of Image Reading Apparatus

Figure 9:
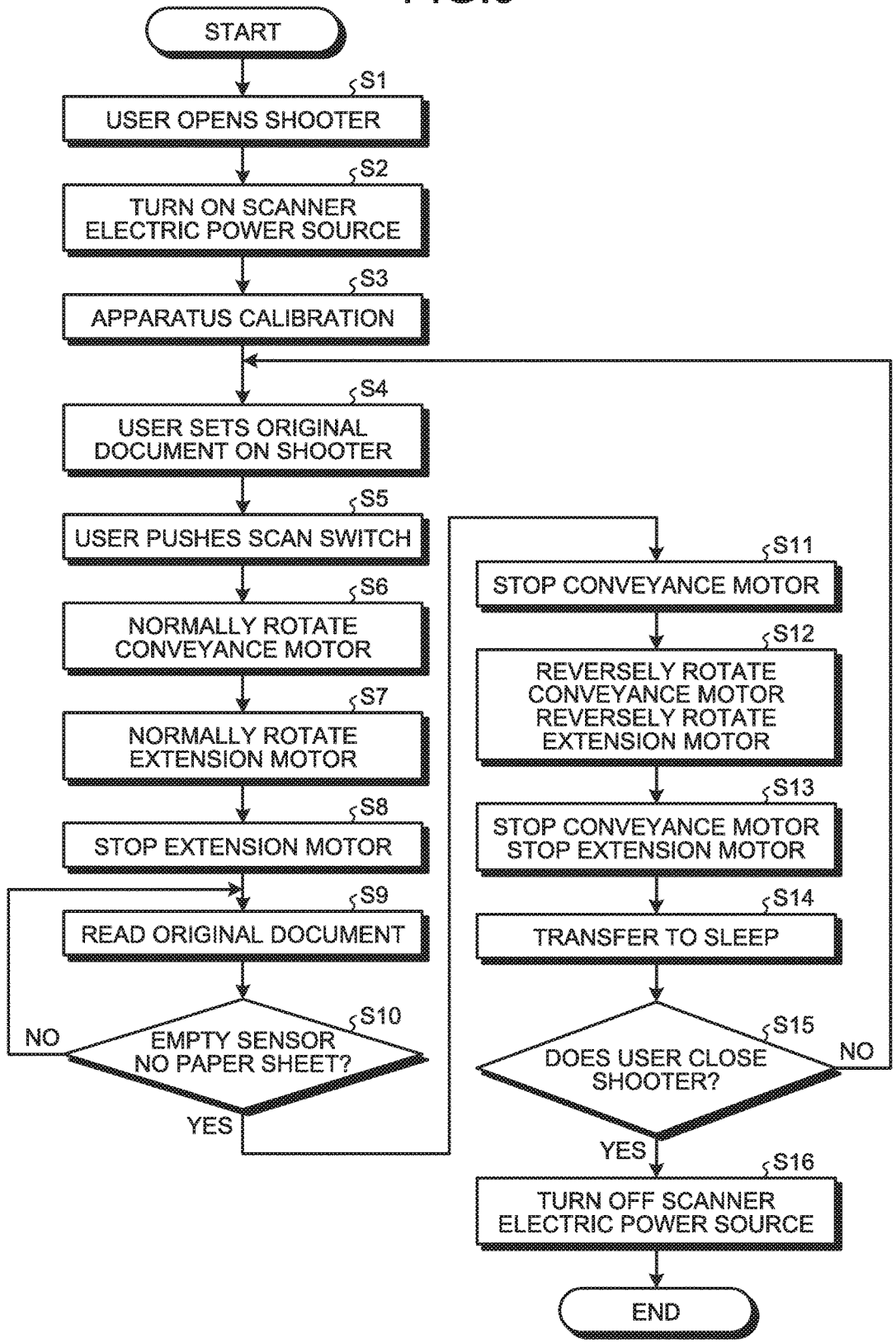
FIG. 9 is a flowchart illustrating an operation of an image reading apparatus.

FIG. 9 is a flowchart illustrating an operation of the image reading apparatus 1. As illustrated in FIG. 9, when a user intends to read an image on a document by using the image reading apparatus 1, such a user first develops the shooter 3 of the image reading apparatus 1 and lengthens the shooter 3 (step S1). The shooter 3 is developed, so that the shooter interlocking switch 75 supplies electric power from an electric power source to the control device 80 (step S2). The control device 80 is booted when electric power is supplied thereto through the shooter interlocking switch 75. When the control device 80 is booted, calibration for each part of the image reading apparatus 1 is first executed (step S3). For a part where its calibration is executed, the reading apparatus 32, the extension motor 72, the empty sensor 73, the scan switch 74, and the conveyance motor 76 are exemplified.

After the shooter 3 is developed and lengthened, a user mounts, on the shooter mounting surface 11, a document that is intended to be read by using the image reading apparatus 1 (step S4). After a document is mounted on the shooter mounting surface 11, a user pushes the scan switch 74 (step S5).

When it is detected that the scan switch 74 is pushed, the control device 80 controls the conveyance motor 76, and thereby, normally rotates the conveyance motor 76 (step S6). The conveyance motor 76 normally rotates, so that the interlocking mechanism 77 rotates the stacker 6 in such a manner that the stacker 6 is arranged in the stacker development region 19. When the stacker 6 rotates from the stacker storage region 18 to the stacker development region 19, the stacker 6 is stopped by the stacker supporting unit 7 so as not to further rotate. A torque that is greater than or equal to a predetermined torque in rotational power that is produced by the conveyance motor 76 is not applied to the stacker 6 by the interlocking mechanism 77, so that the stacker 6 is fixed in a state where the stacker 6 is arranged in the stacker development region 19 when the conveyance motor 76 normally rotates.

The control device 80 controls the extension motor 72 at a point of time when a predetermined period of time is elapsed from a point of time when the conveyance motor 76 starts normal rotation thereof, and thereby, normally rotates the extension motor 72 (step S7). The extension motor 72 normally rotates, so that stacker 6 is lengthened in such a manner that an end part 17 of the stacker 6 moves away from the rotation axis 16. The control device 80 controls the extension motor 72 after the stacker 6 is lengthened, and thereby, stops rotation of the extension motor 72 (step S8). Rotation of the extension motor 72 stops, so that the stacker 6 is fixed in a state where the stacker 6 remains lengthened.

In the conveyance device 31, the conveyance motor normally rotates, so that the plurality of conveyance rollers 41 to 47 normally rotate. The plurality of conveyance rollers 41 to 47 normally rotate, so that the conveyance device 31 conveys a plurality of documents that are mounted on the shooter mounting surface 11, one by one, from the shooter mounting surface 11 to the stacker mounting surface 15 through the conveyance paths 65, 66, and 67.

The control device 80 controls the reading device 32 when the conveyance motor 76 normally rotates, and thereby, reads an image on a front surface and an image on a back surface of a document that is conveyed by the conveyance device 31 one by one (step S9). The control device 80 controls the empty sensor 73 when the conveyance motor 76 normally rotates, and thereby, detects whether a document is mounted on the shooter mounting surface 11 (step S10).

When it is detected that a document is mounted on the shooter mounting surface 11 (step S10, No), the control device 80 continues normal rotation of the conveyance motor 76 and repeats reading images on both surfaces of a document that is conveyed by the conveyance device 31 one by one (step S9).

When the empty sensor 73 detects that a document is not mounted on the shooter mounting surface 11 (step S10, Yes), the control device 80 controls the conveyance motor 76, and thereby, stops normal rotation of the conveyance motor 76 (step S11). When it is detected that a document is not mounted on the shooter mounting surface 11 (step S10, Yes), the control device 80 controls the reading device 32, and thereby, ends reading of an image on a document that is conveyed by the conveyance device 31.

The control device 80 controls the conveyance motor 76 after normal rotation of the conveyance motor 76 stops, and thereby, reversely rotates the conveyance motor 76. The conveyance motor 76 reversely rotates, so that the interlocking mechanism 77 rotates the stacker 6 to move the stacker 6 from the stacker development region 19 to the stacker storage region 18. The control device 80 controls the extension motor 72 while the conveyance motor 76 reversely rotates, and thereby, reversely rotates the extension motor 72 (step S12). The extension motor 72 reversely rotates, so that the stacker 6 is shortened. The stacker 6 is shortened and arranged in the stacker storage region 18, and thereby, stored. The stacker is stored, so that a part of a document that is mounted on the stacker 6 is mounted on the shooter 3.

The control device 80 controls the extension motor 72 after the stacker 6 is stored, and thereby, stops reverse rotation of the extension motor 72. The control device 80 controls the conveyance motor 76 after the stacker 6 is stored, and thereby, stops reverse rotation of the conveyance motor 76 (step S13). After rotation of the conveyance motor 76 and the extension motor 72 is stopped, the image reading apparatus 1 transfers to a sleep state where the reading device 32, the extension motor 72, or the conveyance motor 76 does not consume electric power thereof (step S14). When the image reading apparatus 1 is in a sleep state thereof, a user removes a document that is mounted on the shooter 3.

When a document is removed from the shooter 3 and subsequently an image on another document is intended to be read by using the image reading apparatus 1 (step S15, No), a user mounts another document on the shooter mounting surface 11 again (step S4) and pushes the scan switch 74 (step S5). When the scan switch 74 is pushed, the control device 80 executes a process at step S6 to step S14 again.

When use of the image reading apparatus 1 is ended, a user shortens the shooter 3 and rotates the shooter 3 in such a manner that the shooter 3 is arranged on the stored stacker 6, so that the shooter 3 is stored. The shooter 3 is stored (step S15, Yes), so that the shooter interlocking switch 75 stops supplying electric power to the control device 80 (step S16).

Figure 10:
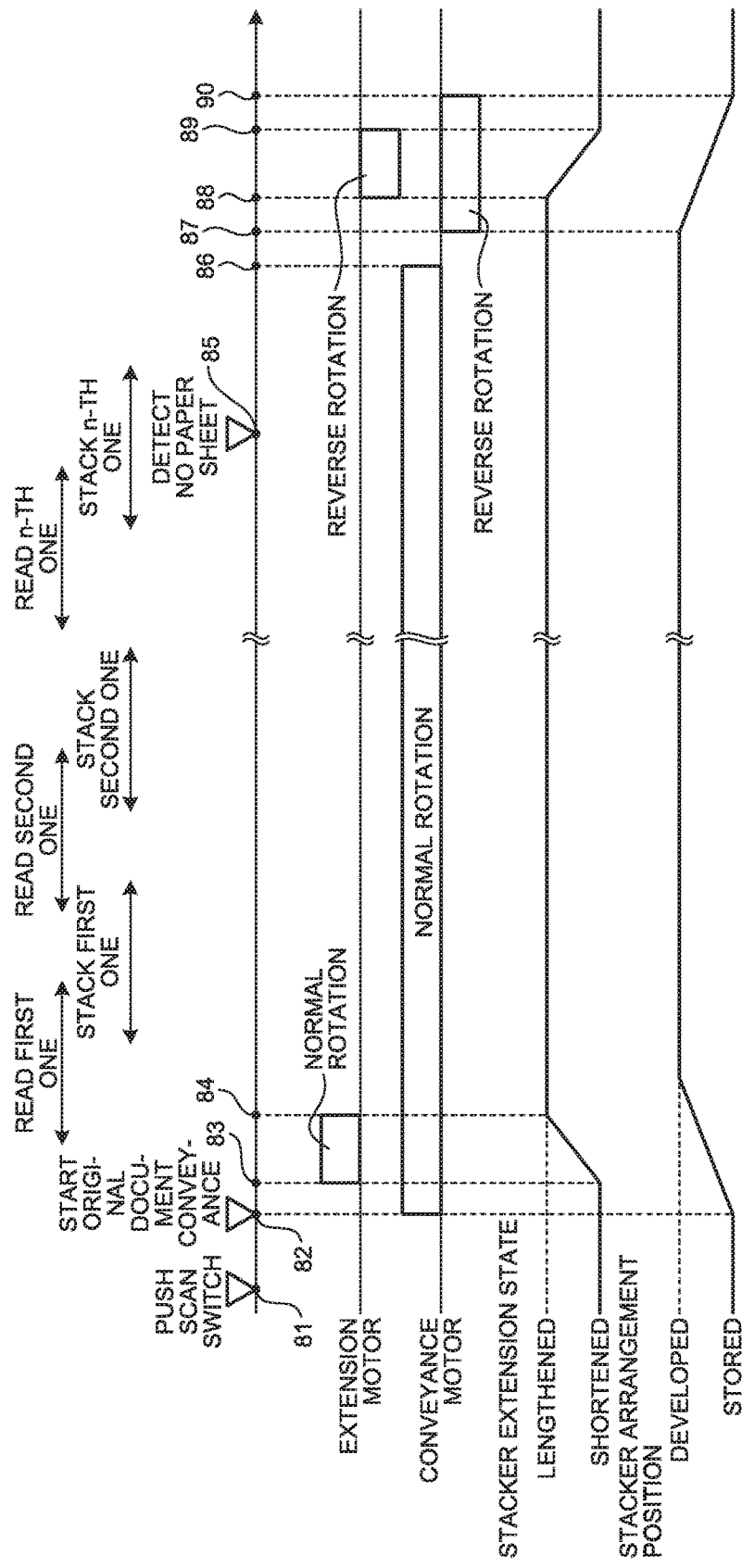
FIG. 10 is a time chart illustrating timing of an operation of a conveyance motor and timing of an operation of an extension motor.

FIG. 10 is a time chart illustrating timing of an operation of the conveyance motor 76 and timing of an operation of the extension motor 72. As illustrated in FIG. 10, the control device 80 normally rotates the conveyance motor 76 at a point of time 82 when a predetermined period of time is elapsed from a point of time 81 when it is detected that the scan switch 74 is pushed. The control device 80 normally rotates the extension motor 72 at a point of time 83 when a predetermined period of time is elapsed from the point of time 82. Such a predetermined period of time is set in such a manner that the stacker 6 is not lengthened when the stacker 6 is arranged in the stacker storage region 18. The control device 80 stops normal rotation of the extension motor 72 at a point of time 84 when a predetermined period of time is elapsed from the point of time 83. Such a predetermined period of time is set in such a manner that the stacker 6 is sufficiently lengthened to have a length such that a document is appropriately mounted on the stacker 6.

The control device 80 stops normal rotation of the conveyance motor 76 at a point of time 86 when a predetermined period of time is elapsed from a point of time 85 when the empty sensor 73 detects that a document is not mounted on the shooter mounting surface 11. The control device 80 reversely rotates the conveyance motor 76 at a point of time 87 when a predetermined period of time is elapsed from the point of time 86. The control device 80 reversely rotates the extension motor 72 at a point of time 88 when a predetermined period of time is elapsed from the point of time 87. Such a predetermined period of time is set in such a manner that a document that is mounted on the stacker 6 is appropriately mounted on the shooter 3. The control device 80 stops reverse rotation of the extension motor 72 at a point of time 89 when a predetermined period of time is elapsed from the point of time 88. Such a predetermined period of time is set in such a manner that the stacker 6 is sufficiently shortened in such a manner that it is possible to arrange the stacker 6 in the stacker storage region 18. The control device 80 stops reverse rotation of the conveyance motor 76 at a point of time 90 when a predetermined period of time is elapsed from the point of time 89. Such a predetermined period of time is set in such a manner that the stacker 6 is arranged in the stacker storage region 18.

Figure 11:
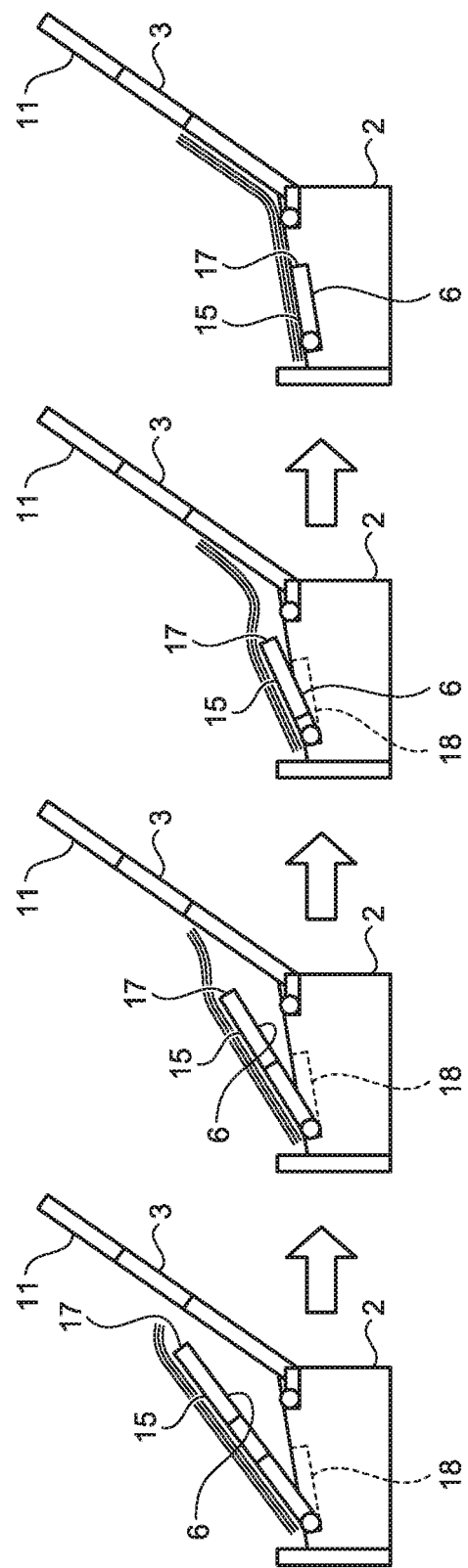
FIG. 11 is a side view illustrating behavior of a document when a stacker is stored.

FIG. 11 is a side view illustrating behavior of a document when the stacker 6 is stored. The stacker 6 is stored, so that a part of a document that is mounted on the stacker 6 that is arranged in the stacker development region 19 is mounted on the shooter mounting surface 11 of the shooter 3 as illustrated in FIG. 11.

Figure 12:
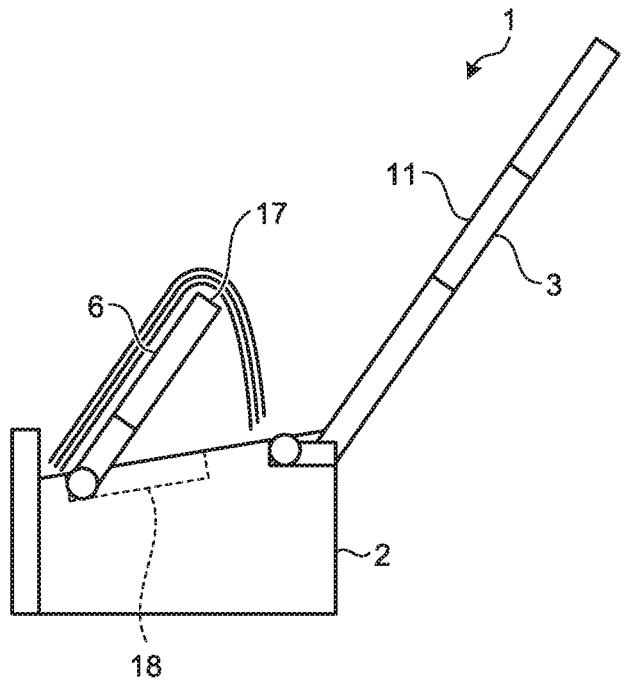
FIG. 12 is a side view illustrating behavior of a document when a stacker is shortened while the stacker remains arranged in a stacker development region.

FIG. 12 is a side view illustrating behavior of a document when the stacker 6 is shortened while the stacker 6 remains arranged in the stacker development region 19. As illustrated in FIG. 12, an upper end of a document that is mounted on the stacker 6 that is arranged in the stacker development region 19 hangs from the stacker 6 when the stacker 6 is shortened before rotating thereof, so that such a document is not appropriately mounted on the shooter mounting surface 11 of the shooter 3.

Figure 13:
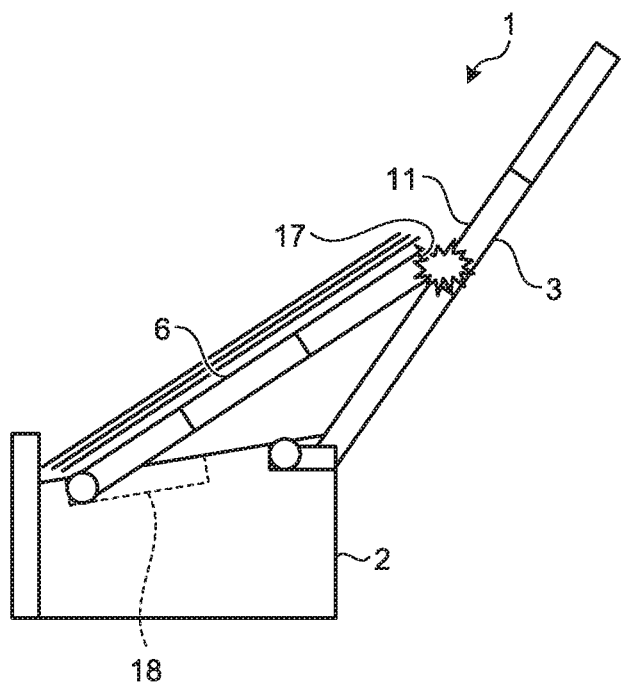
FIG. 13 is a side view illustrating behavior of a stacker when the stacker rotates while the stacker remains lengthened.

FIG. 13 is a side view illustrating behavior of the stacker 6 when the stacker 6 rotates while the stacker 6 remains lengthened. When the stacker 6 that is arranged in the stacker development region 19 rotates toward the stacker storage region 18 while the stacker 6 remains lengthened, the end part 17 collides with the shooter 3 as illustrated in FIG. 13.

The stacker 6 is shortened while the stacker 6 rotates toward the stacker storage region 18, so that it is possible for the image reading apparatus 1 to prevent hanging of a document that is mounted on the stacker 6 and collision of the end part 17 with the shooter 3. The image reading apparatus 1 prevents hanging of a document and collision of the end part 17, so that it is possible to appropriately mount, on the shooter mounting surface 11 of the shooter 3, a document that is mounted on the stacker 6 that is arranged in the stacker development region 19. A period of time from the point of time 82 to the point of time 83 in a time chart of FIG. 10 is set in such a manner that the end part 17 of the stacker 6 does not collide with the shooter 3 when the stacker 6 moves from the stacker storage region 18 to the stacker development region 19.

Effect of Image Reading Apparatus

The image reading apparatus 1 according to an embodiment includes the shooter 3, the stacker 6, the stacker supporting unit 7, the conveyance device 31, and the reading device 32. For the shooter 3, the shooter mounting surface 11 that is inclined with respect to a horizontal plane is formed thereon. For the stacker 6, the stacker mounting surface 15 is formed thereon. The stacker supporting unit 7 movably supports the stacker 6 in such a manner that the stacker 6 is arranged in the stacker development region 19 or the stacker storage region 18. When the stacker 6 is arranged in the stacker development region 19, the conveyance device 31 conveys a document from the shooter 3 to the stacker 6, and thereby, mounts such a document on the stacker mounting surface 15. A back surface for a surface that faces the shooter mounting surface 11, of a document that is mounted on the shooter mounting surface 11, faces the stacker mounting surface 15 after conveyance thereof. When a document is conveyed by the conveyance device 31, the reading device 32 reads an image from such a document. A surface area of a region of the shooter mounting surface 11 that is covered by the stacker 6 when the stacker 6 is arranged in the stacker development region 19 is greater as compared with that when the stacker 6 is arranged in the stacker storage region 18. The stacker 6 is formed to be capable of being lengthening or shortened in such a manner that the stacker 6 is lengthened when the stacker 6 is arranged in the stacker development region 19 or the stacker 6 is shortened when the stacker 6 is arranged in the stacker storage region 18.

Such an image reading apparatus 1 exposes the shooter mounting surface 11 of the shooter 3 when the stacker 6 is stored, and thereby, is not disturbed by the stacker 6 when a document is mounted on the shooter 3 but facilitates mounting such a document on the shooter 3. Such an image reading apparatus 1 lengthens the stacker 6 to be long, so that it is possible to mount a document on the stacker 6 appropriately. Such an image reading apparatus 1 shortens the stacker 6 to be short, so that it is possible to store the stacker 6 in a small space and it is possible to downsize the stacker storage region 18 where the stacker 6 is stored therein. Such an image reading apparatus 1 downsizes the stacker storage region 18, so that it is possible to miniaturize an entire apparatus or it is possible to form a compact one.

The stacker supporting unit 7 rotatably supports the stacker 6 in such a manner that the stacker 6 is arranged in the stacker development region 19 or the stacker storage region 18. Such an image reading apparatus 1 rotates the stacker 6 and thereby stores the stacker 6, so that it is possible to readily fabricate the image reading apparatus 1 and it is possible to reduce a manufacturing cost thereof, as compared with another image reading apparatus that translates the stacker 6 and thereby stores the stacker 6.

The stacker storage region 18 is closer to the shooter 3 than the stacker development region 19. Such an image reading apparatus 1 downsizes the stacker storage region 18 even when the stacker storage region 18 is formed between the stacker development region 19 and the shooter 3, so that it is possible to miniaturize an entire apparatus or it is possible to form a compact one.

Although the stacker storage region 18 is arranged between the shooter 3 and the stacker 6 at a time of reading of a document in the image reading apparatus 1 according to an embodiment, the stacker storage region 18 may be arranged at another position. For example, the stacker storage region 18 may be arranged on a front side of such an apparatus. An image reading apparatus where the stacker storage region 18 is arranged on a front side thereof also exposes the shooter 3 when the stacker 6 is stored, so that mounting a document on the shooter 3 is facilitated, and shortens the stacker 6, so that it is possible to downsize the stacker storage region 18.

Although the stacker 6 rotates and thereby is stored in the image reading apparatus 1 according to an embodiment, the stacker 6 may be stored by translation thereof. For a position where the stacker storage region 18 is arranged, a front side of such an apparatus is exemplified. An image reading apparatus where the stacker 6 is stored by translation thereof also exposes the shooter 3 when the stacker 6 is stored, so that mounting a document on the shooter 3 is facilitated, and shortens the stacker 6, so that it is possible to downsize the stacker storage region 18.

The image reading apparatus 1 according to an embodiment further includes the stacker actuator 71 for moving the stacker 6 in such a manner that the stacker 6 is arranged in the stacker development region 19 or the stacker storage region 18. Such an image reading apparatus 1 automatically moves the stacker 6 from the stacker development region 19 to the stacker storage region 18, so that a user does not have to mover the stacker 6 and it is possible for a user to reduce labor for storing the stacker 6.

The stacker actuator 71 has the conveyance motor 76 and the interlocking mechanism 77. The conveyance motor 76 normally rotates or reversely rotates. The conveyance motor 76 normally rotates, so that the interlocking mechanism 77 moves the stacker 6 in such a manner that the stacker 6 is arranged in the stacker development region 19. The conveyance motor 76 reversely rotates, so that the interlocking mechanism 77 moves the stacker 6 in such a manner that the stacker 6 is arranged in the stacker storage region 18. The conveyance motor 76 normally rotates, so that the conveyance device 31 conveys a document from the shooter 3 to the stacker 6. Such an image reading apparatus 1 utilizes, for movement of the stacker 6, the conveyance motor 76 that is utilized for conveyance of a document, and thereby, does not have to provide a motor for movement of the stacker 6 separately from the conveyance motor 76, so that it is possible to reduce the number of components thereof and reduce a manufacturing cost thereof.

Although the image reading apparatus 1 according to an embodiment moves the stacker 6 by using the conveyance motor 76, the stacker 6 may be moved by using an actuator separate from the conveyance motor 76. An image reading apparatus that includes an actuator separate from the conveyance motor 76 also automatically moves the stacker 6, so that a user does not have to move the stacker 6 and it is possible for a user to reduce labor for storing the stacker 6.

Although the image reading apparatus 1 according to an embodiment includes the stacker actuator 71, the stacker actuator 71 may be omitted. For an image reading apparatus where the stacker actuator 71 is omitted, for example, a user manually moves the stacker 6. An image reading apparatus where the stacker actuator 71 is omitted also moves the stacker 6 from the stacker development region 19 to the stacker storage region 18, so that it is possible to facilitate mounting a document on the shooter 3.

The image reading apparatus 1 according to an embodiment further includes the extension motor 72 and the control device 80. The extension motor 72 lengthens or shortens the stacker 6. The control device 80 controls the extension motor 72 in such a manner that the stacker 6 is lengthened when the stacker 6 is arranged in the stacker development region 19 and the stacker 6 is shortened when the stacker 6 is arranged in the stacker storage region 18. Such an image reading apparatus 1 automatically lengthens or shortens the stacker 6 when the stacker 6 is moved, so that a user does not have to lengthen or shorten the stacker 6 and it is possible for a user to reduce labor for lengthening or shortening the stacker 6.

The control device 80 controls the stacker actuator 71 in such a manner that the stacker 6 moves to the stacker development region 19 when reading of a document by the reading device 32 is started. Such an image reading apparatus 1 automatically stands the stacker 6 when a document is read, so that a user does not have to stand the stacker 6 and it is possible for a user to reduce labor for standing the stacker 6.

The control device 80 further controls the stacker actuator 71 and the extension motor 72 in such a manner that the stacker 6 is shortened while the stacker 6 moves from the stacker development region 19 to the stacker storage region 18. It is possible for such an image reading apparatus 1 to prevent a document that is mounted on the stacker 6 from falling down or prevent the stacker 6 from colliding with the shooter 3, when the stacker 6 is stored.

Although the image reading apparatus 1 according to an embodiment shortens the stacker 6 while the stacker 6 is moved, the stacker 6 may be shortened when the stacker 6 stops. Also in an image reading apparatus that shortens the stacker 6 when the stacker 6 stops, a user does not have to lengthen or shorten the stacker 6 and it is possible for a user to reduce labor for lengthening or shortening the stacker 6.

Although the image reading apparatus 1 according to an embodiment includes the extension motor 72, the extension motor 72 may be omitted. An image reading apparatus where the extension motor 72 is omitted also exposes the shooter 3, so that mounting a document on the shooter 3 is facilitated, and shortens the stacker 6, so that it is possible to downsize the stacker storage region 18.

The image reading apparatus 1 according to an embodiment further includes the empty sensor 73 that detects whether a document is mounted on the shooter mounting surface 11. When the empty sensor 73 detects that a document is not mounted on the shooter mounting surface 11, the control device 80 controls the stacker actuator 71 in such a manner that the stacker 6 is arranged in the stacker storage region 18. Such an image reading apparatus 1 stores the stacker 6 when a document is not mounted on the shooter mounting surface 11, so that it is possible to transfer to a sleep state thereof and it is possible to reduce electric power consumption thereof.

Although the image reading apparatus 1 according to an embodiment includes the empty sensor 73, the empty sensor 73 may be omitted. Also in an image reading apparatus where the empty sensor 73 is omitted, a user manually stores the stacker 6 and thereby exposes the shooter 3, so that mounting a document on the shooter 3 is facilitated, and shortens the stacker 6, so that it is possible to downsize the stacker storage region 18.

The shooter 3 of the image reading apparatus 1 according to an embodiment is movably supported in such a manner that the end part 14 of the shooter 3 moves down when the stacker 6 is arranged in the stacker storage region 18. Such an image reading apparatus 1 moves down the end part 14 on an upper side of the shooter 3, so that it is possible to reduce an apparatus height, it is possible to downsize an entire apparatus, and it is possible to form a compact one.

Although the image reading apparatus 1 according to an embodiment is capable of storing the shooter 3, the shooter 3 does not have to be stored. An image reading apparatus where the shooter 3 is not stored also exposes the shooter 3, so that mounting a document on the shooter 3 is facilitated, and shortens the stacker 6, so that it is possible to downsize the stacker storage region 18.

Although the shooter 3 or the stacker 6 of the image reading apparatus 1 according to an embodiment is formed in such a manner that an angle of the shooter mounting surface 11 or the stacker mounting surface 15 with respect to a horizontal plane is 55 degrees, such an angle may be equal to another angle. When such an angle is greater than 45 degrees and less than or equal to 65 degrees, it is possible for the shooter 3 or the stacker 6 to reduce a width of an installation space in a depth direction without buckling a document to be mounted.

Although the reading device 32 includes the lower image sensor 61 and the upper image sensor 62 in the image reading apparatus 1 according to an embodiment, either one may be replaced by a conveyance guide. An image reading apparatus where one of the lower image sensor 61 and the upper image sensor 62 is replaced by a conveyance guide reads only one surface of a document to be conveyed. Such an image reading apparatus also stores the stacker 6 and thereby exposes the shooter 3, so that mounting a document on the shooter 3 is facilitated, and shortens the stacker 6, so that it is possible to downsize the stacker storage region 18.

It is possible to further downsize a disclosed image reading apparatus.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. An image reading apparatus, comprising:
a shooter where a first mounting surface that is inclined with respect to a horizontal plane is formed thereon;
a stacker where a second mounting surface is formed thereon;
a supporting unit that movably supports the stacker in such a manner that the stacker is arranged in a first region or a second region;
a conveyance unit that conveys a document that is mounted on the first mounting surface from the shooter to the stacker in such a manner that a back surface for a surface of the document that faces the first mounting surface faces the second mounting surface after conveyance thereof when the stacker is arranged in the first region, and thereby, mounts the document on the second mounting surface; and
a reading unit that reads an image from the document when the document is conveyed by the conveyance unit, wherein
a surface area of a region of the first mounting surface that is covered by the stacker when the stacker is arranged in the first region is greater than a surface area of a region of the first mounting surface that is covered by the stacker when the stacker is arranged in the second region, and
the stacker is formed to be capable of being lengthened or shortened in such a manner that the stacker is lengthened when the stacker is in the first region and the stacker is shortened when the stacker is in the second region.

2. The image reading apparatus according to claim 1, wherein the supporting unit rotatably supports the stacker in such a manner that the stacker is arranged in the first region or the second region.

3. The image reading apparatus according to claim 2, wherein the second region is closer to the shooter than the first region.

4. The image reading apparatus according to claim 3, further comprising
an actuator that moves the stacker in such a manner that the stacker is arranged in the first region or the second region.

5. The image reading apparatus according to claim 4, wherein:
the actuator has:
a motor that normally rotates or reversely rotates; and
an interlocking mechanism that moves the stacker in such a manner that the stacker is arranged in the first region when the motor normally rotates, and moves the stacker in such a manner that the stacker is arranged in the second region when the motor reversely rotates, wherein
the conveyance unit conveys the document from the shooter to the stacker when the motor normally rotates.

6. The image reading apparatus according to claim 4, further comprising:
an extension actuator that lengthens or shortens the stacker; and
a controller configured to control the extension actuator in such a manner that the stacker is lengthened when the stacker is arranged in the first region and the stacker is shortened when the stacker is arranged in the second region.

7. The image reading apparatus according to claim 6, wherein the controller controls the actuator in such a manner that the stacker moves to the first region when reading of the document by the reading unit is started.

8. The image reading apparatus according to claim 6, wherein the controller controls the actuator and the extension actuator in such a manner that the stacker is shortened while the stacker moves from the first region to the second region.

9. The image reading apparatus according to claim 8, further comprising
a sensor that detects whether the document is mounted on the first mounting surface, wherein
the controller controls the actuator in such a manner that the stacker is arranged in the second region when it is detected that the document is not mounted on the first mounting surface.

10. The image reading apparatus according to claim 1, wherein the shooter is movably supported in such a manner that an upper end of the shooter moves down when the stacker is arranged in the second region.

* * * * *